(12) United States Patent
Frattalone

(10) Patent No.: US 10,885,578 B2
(45) Date of Patent: Jan. 5, 2021

(54) METHOD AND SYSTEM FOR IMPLEMENTING A COMBINED INVESTMENT

(76) Inventor: Nicholas Frattalone, Hampton, NJ (US)

( * ) Notice: Subject to any disclaimer, the term of this patent is extended or adjusted under 35 U.S.C. 154(b) by 0 days.

(21) Appl. No.: 09/923,161

(22) Filed: Aug. 6, 2001

(65) Prior Publication Data

US 2002/0019793 A1 Feb. 14, 2002

Related U.S. Application Data

(60) Provisional application No. 60/223,193, filed on Aug. 4, 2000, provisional application No. 60/263,905, filed on Jan. 24, 2001.

(51) Int. Cl.
*G06Q 40/00* (2012.01)
*G06Q 40/06* (2012.01)
*G06Q 40/02* (2012.01)

(52) U.S. Cl.
CPC ............ *G06Q 40/02* (2013.01); *G06Q 40/06* (2013.01)

(58) Field of Classification Search
CPC ............................. G06Q 40/00; G06Q 40/06
USPC ..................................................... 705/35–45
See application file for complete search history.

(56) References Cited

U.S. PATENT DOCUMENTS

| | | | |
|---|---|---|---|
| 4,346,442 A | 8/1982 | Musmanno | 705/36 |
| 4,376,978 A | 3/1983 | Musmanno | 705/36 |
| 4,597,046 A | 6/1986 | Musmanno et al. | 705/36 |
| 4,774,663 A | 9/1988 | Musmanno et al. | 705/36 |
| 4,876,648 A | 10/1989 | Lloyd | 705/38 |
| 4,953,085 A | 8/1990 | Atkins | 705/36 |
| 5,644,726 A * | 7/1997 | Oppenheimer | G06Q 20/102 705/35 |
| 5,689,649 A | 11/1997 | Altman et al. | 705/36 |
| 5,812,987 A | 9/1998 | Luskin et al. | 705/36 |
| 5,884,285 A | 3/1999 | Atkins | 705/36 |
| 5,911,136 A | 6/1999 | Atkins | 705/36 |

(Continued)

OTHER PUBLICATIONS

Lefeaux, Peter; Real Estate Limited Partnerships Safe Bet; Jun. 26, 1995, The Vancouver Sun; Vancouver, B.C.; p. D7; found at http://proquest.umi.com.*

(Continued)

*Primary Examiner* — Hai Tran
(74) *Attorney, Agent, or Firm* — Fox Rothschild LLP

(57) ABSTRACT

A method and apparatus for implementing a combined investment. Financing is obtaining by collateralizing a first investment representing ownership interests of a plurality of independent investors. The financing is used to acquire a second investment. At least a portion of any returns on the second investment is applied to the benefit of the independent investors. In this manner, investors effectively get the benefit of two investments for the cost of one. By differentiating the asset classes of the two investments, greater diversification is provided. Through pooling of investor capital and/or fractional share ownership, even greater diversification and better investment opportunities may be achieved. By selecting complementary investments, e.g. growth oriented securities and income-producing real estate, a beneficial synergistic effect may be obtained when the investments are cooperatively managed, e.g. by cross-utilizing returns, with a common objective of providing enhanced returns.

7 Claims, 4 Drawing Sheets

(56) References Cited

U.S. PATENT DOCUMENTS

| | | | |
|---|---|---|---|
| 5,950,175 A | | 9/1999 | Austin .......................... 705/35 |
| 6,018,722 A | | 1/2000 | Ray et al. ..................... 705/36 |
| 6,021,397 A | | 2/2000 | Jones et al. .................. 705/36 |
| 6,055,517 A | | 4/2000 | Friend et al. ................. 705/36 |
| 6,070,151 A | * | 5/2000 | Frankel ..................... 705/36 R |
| 6,122,623 A | | 9/2000 | Garman ........................ 705/36 |

OTHER PUBLICATIONS

Use of Property Gains Popularity as Financial Tool; Reinbach, Andrew, Pensions and Investment Age, Chicago, Jan. 9, 1989. vol. 17, Iss. 1.*
Evolution of Canadian Credit Markets; Durland, Michael, Canadian Investment Review, Toronto, Spring 2001, vol. 14, Iss. 1, p. 49.*
Carver, Income Collateralized Loans: Market and Policy Explorations a Dissertation 2004.*
"Unlimited Advantages$^{SM}$", Merrill Lynch Secondary Mortgage Lender brochure, Merrill Lynch Credit Corporation (2001)(2 pp.).
"Securities-Based Financing," Merrill Lynch Business Center, 3 pp. excerpted from http://www.businesscenter.ml.com.

* cited by examiner

METHOD AND SYSTEM FOR IMPLEMENTING A COMBINED INVESTMENT

RELATED APPLICATIONS

This application is related to and claims the benefit of U.S. Provisional Patent Application No. 60/223,193, filed Aug. 4, 2000, and U.S. Provisional Patent Application No. 60/263,905, filed Jan. 24, 2001. The entire disclosures of U.S. Provisional Patent Application Nos. 60/223,193 and 60/263,905 are hereby incorporated herein by reference.

FIELD OF THE INVENTION

The present invention relates generally to financial investment. In particular, the present invention relates to a method and system for implementing a combined investment through collateralized lending.

BACKGROUND OF THE INVENTION

Individuals, governments, pension funds, corporations, etc. make financial investments. A financial investment is basically a current commitment of dollars for a period of time in order to derive future payments. The objective of the investment is to derive future payments that will compensate for at least the time the funds are committed, the expected rate of inflation, and the uncertainty of the future payments. In essence, the investor is trading a known dollar amount today for future payments that are expected to be greater than the current outlay of dollars. Of particular note are the long term savings of individual investors, such as retirement-related investments.

A typical investment strategy involves identification of investment objectives and consideration of risk tolerance and expected rates of return. These criteria form the basis for selecting from among available investment opportunities. Most available investment opportunities generally fall within the broad categories of financial assets or real assets.

Financial assets include assets providing payoffs primarily in the form of money. Financial assets may be broken down into several asset classes. One asset class includes fixed-income investments. For example, this asset class includes investments having a contractually mandated payment schedule, such as savings accounts, certificates of deposit (CDs), U.S. Treasury bills, U.S. Treasury securities, U.S. government agency securities, municipal bonds, and corporate bonds, including senior secured bonds, debentures, subordinated bonds, income bonds and convertible bonds, collectively "debt obligations". Preferred stock is often considered to fall within this class. Such investments typically offer relatively low risk, but offer no opportunity for growth of investment capital and only moderate rates of return. Additionally, many of such investment opportunities require minimum investments that are difficult to attain for many investors, e.g. $10,000 or more.

Another financial asset class includes equity investments. This asset class includes common stock investments that involve company ownership, and therefore do not have contractually specified payments. Equities offer a broad range of risk/return opportunities varying as a function of the subject company. Various strategies exist for selecting stocks offering greater or lesser risk. In financial parlance, "blue chip" stocks include stocks of large, credit-worthy companies that are typically considered to offer relatively lower risk and greater promise of sustained long term growth.

Additional financial asset classes include special equity instruments such as warrants and options, and futures contracts, each of which is generally regarded as a relatively high-risk investment.

Real assets include investments in identifiable property, such as real estate. Various real estate investment opportunities are available, such as direct investment in raw land primarily for speculative/growth purposes (high risk) or in established income-producing properties primarily for income purposes (low risk). For example, income producing properties include commercial and residential rental properties such as office buildings, shopping centers and apartment houses, and ongoing business concerns, such as a restaurant franchises, manufacturing facilities, retail stores, etc. Direct investment is typically highly capital intensive, often requiring a minimum investment in excess of $1,000,000, which is difficult to attain for most investors.

It is well known that risk can be lessened, and average returns increased, through diversification, i.e. by dividing investment capital among a variety of investments in different asset classes and/or with different risk, reward, and other characteristics. Many investment companies sell shares in mutual funds that are themselves diversified portfolios holding combinations of stocks, bonds and other investment instruments. From the investor's perspective, a single investment in the mutual fund provides a degree of enhanced diversification relative to a single investment in any of the underlying investments. Mutual funds are typically advantageous because they offer investment opportunities in smaller dollar amounts by permitting ownership of fractional shares of the mutual funds' underlying assets, which facilitates diversification by allowing investment in a broader range of assets for a given amount of investment capital. Accordingly, each investor has an opportunity to benefit, in fractional proportion, from an investment or group of investments that the investor might not otherwise be capable of making.

Various combinations of investments, e.g. shares of stock from diverse industry sectors, may be bundled in a mutual fund to better achieve investment objectives, such as preservation of capital, tax sheltering, long term growth, income production, etc. Risk-reducing hedging effects can be obtained by carefully selecting combinations of investments.

Real estate investment trusts (REITs) allow for indirect investment in real estate. REITs hold portfolios of real estate investments and offer mutual fund-like diversification benefits in the context of real assets.

From the limited discussion above it is apparent that each investor must first determine how much capital the investor has available for investment. Then, the investor defines goals and allocates that capital to various investments to achieve those goals. Because the investor's investment capital is limited, an allocation of finds to one investment excludes allocation of those same funds to an alternative investment. It is therefore often difficult for an investor to achieve the desired level of diversification and/or investment in the desired investments/asset classes. This is particularly the case when the investor's total investment capital is less than the aggregated minimum investments for the desired investments.

For example, an investor having $1,000,000 to invest may choose to invest $1,000,000 solely in "blue chip" common stocks. Traditional wisdom indicates that such an investment is relatively likely to provide sustained long term growth.

Accordingly, the investor gets the maximum benefit, for his available investment capital, of the growth prospects associated with these stocks.

Alternatively, the individual investor may choose to invest his $1,000,000 in a fast food restaurant having a well-established history as income-producing real estate. According to traditional wisdom, such an investment will likely provide a substantial income stream, but relatively little chance for growth. Accordingly, the investor gets the maximum benefit, for his available investment capital, of the income-producing prospects associated with this real estate investment.

Alternatively, the investor may choose to invest $400,000 in common stock and $600,000 in less expensive income-producing residential real estate. Alternatively, the investor might be able to invest $1,000,000 in a mutual fund (if such a fund were to exist) investing 40% in blue chip common stocks and 60% in income-producing real estate. Such strategies offer a degree of risk-reducing diversification. However, in either scenario, the extent of growth obtainable by the common stock is lessened by the degree of investment in the real estate, and vice versa. In other words, such an investment suffers from a "capital allocation" problem.

As another alternative, the investor might be able to obtain lending from a financier, e.g. by pledging the real estate as collateral to support a loan for an additional $400,000 of capital to purchase the $1,000,000 real estate referred to above and invest $400,000 in common stock. However, this encumbers the real estate and weakens any offer to purchase the real estate due to financing contingencies and/or possible financing complications that may prevent completion of the sale of the real estate. Similarly, such an investment suffers from the capital allocation problem.

Various investment firms provide financial services whereby an individual having an investment account with the investment firm, may borrow against assets held in that account. For example, the investment firm of Merrill Lynch, Pierce, Fenner and Smith, Inc. of New York, N.Y., USA offers such securities-based financing. For example, an individual having $2 million in assets, e.g. marketable securities, in an account with the investment firm could use such financing to borrow against that account, e.g. using a line of credit or term loan, to purchase a luxury item, business asset, etc., e.g. a restaurant franchise selling for $1 million.

While such securities-based lending mitigates the capital allocation problem, it nevertheless provides an unsatisfactory range of investment options, particularly with respect to income-producing real estate. Specifically, an individual's investment options are limited because the investment capital of any given individual is limited. Certain desirable investments may require more investment capital that the individual has and therefore be unobtainable. Additionally, such securities-based financing fails to provide beneficial diversification effects and diverse investment options akin to those available to investors of mutual funds. This is exacerbated because the cost of income-producing real estate typically exceeds or comprises such a large portion of an individual investor's available investment capital. More specifically, such methodology lacks sufficient diversification and other beneficial effects available through pooling of investor assets and/or fractional share ownership, i.e. benefits similar to those available through mutual fund purchases of securities versus an individual investor's purchase of the individual securities making up the mutual fund.

What is needed is an investment technique which provides for the beneficial effects of diversification, pooled asset investment and fractional share ownership, without the need for capital allocation or additional investment capital.

SUMMARY OF THE INVENTION

The present invention provides a method and apparatus for implementing a combined investment. Financing is obtained by collateralizing a collateralizable first investment representing ownership interests of a plurality of independent investors. The financing is used to acquire a second investment. At least a portion of any returns on the second investment is applied to the benefit of the investors in the first investment. In this manner, investors effectively get the benefit of two investments for the cost of one. By differentiating the asset classes of the two investments, greater diversification is provided. Through pooling of investor capital and/or fractional share ownership, even greater diversification, enhanced safety, and better investment opportunities may be achieved. For example, more investment opportunities exist, and better diversification opportunities exist, when investing $100,000,000 of pooled investors' capital, rather than $100,000 of a single investor's investment capital. By selecting complementary investments, e.g. growth oriented securities and income-producing real estate, a beneficial synergistic effect may be obtained when the investments are managed with a common objective of providing enhanced returns, e.g. by cross-utilizing returns from the different investments.

DETAILED DESCRIPTION

The present invention provides a novel method and system for implementing a combined investment. Conceptually, the present invention provides for leveraging a collateralizable first investment for the purpose of acquiring and/or operating a second investment. By using investors' investment dollars to acquire the first investment, and borrowing against the first investment to acquire the second investment, the capital allocation problem is mitigated and investors effectively get the benefit of two investments for the cost of one. No additional capital is needed. Through pooling of investor assets and/or fractional share ownership in diverse asset classes, greater diversification and better investment opportunities may be achieved. Accordingly, investors in existing investments, e.g. mutual funds, pension funds, etc., may benefit from the present invention when at least a portion of those investments are leveraged in accordance with the present invention to purchase additional investments, e.g. income-producing assets, or to reorganize debt on existing assets, without the need for additional capital contributions.

Figure 1:
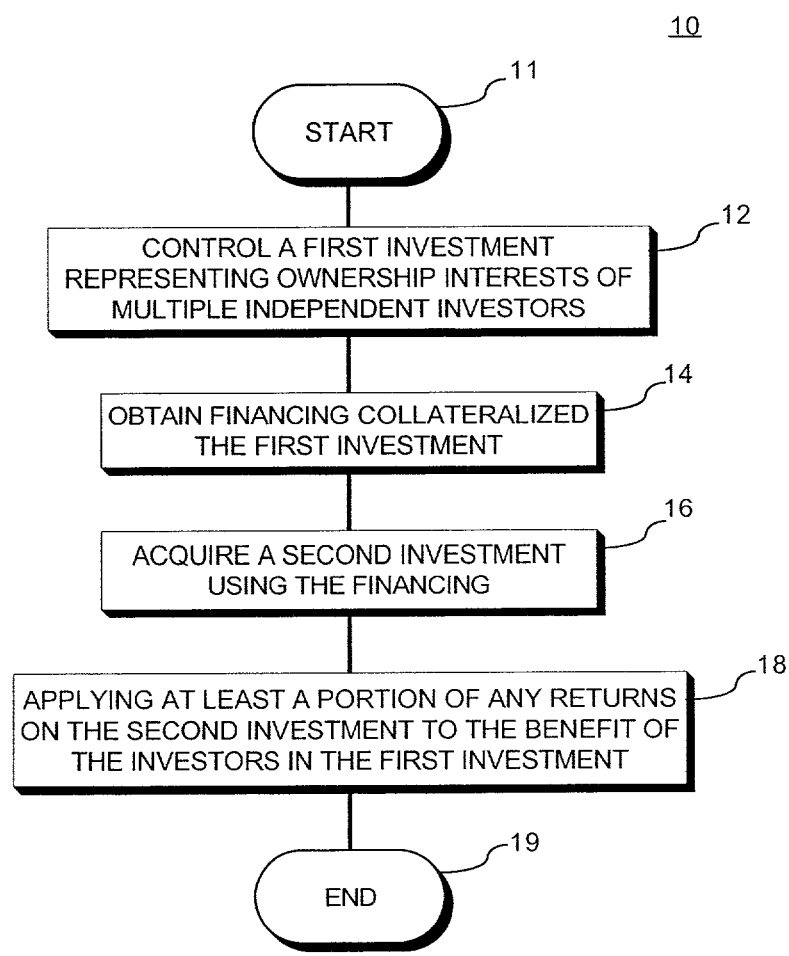
FIG. 1 is a flow diagram of an overview of exemplary logic for implementing a combined asset class investment in accordance with the present invention.

The present invention is discussed in detail below with reference to FIGS. 1-3. FIG. 1 is a flow diagram 10 of an overview of exemplary logic for implementing a combined asset investment in accordance with the present invention. Referring now to FIG. 1, the inventive method starts with controlling of a first investment, as shown at steps 11 and 12. As used herein, "controlling" refers to sufficient control, capacity and/or authority to pledge the first investment as collateral, as discussed further below with respect to step 14. For example, "controlling" may refer to administering an investment vehicle, such as a mutual fund designed to track the S&P 500 or other indices, managing a fund, or actively managing a portfolio to provide enhanced returns, e.g. as by an investment firm. As used herein, the term "independent investor" may include one or more individuals, corporations or other legal entities, mutual or similar funds, pension plans/funds, insurance companies, institutional investors, etc. Accordingly, controlling includes having or receiving ("receiving") control over any assets associated with a pension fund, mutual fund or other investment assets.

As shown at step 12, the portfolio "represents" ownership interests of multiple independent investors. For example, a typical mutual fund or pension fund represents ownership interests of multiple independent inventors resulting from pooled capital contributions of multiple independent inventors. It is not necessary that each investor be a direct investor in the first investment. Rather, pension funds or pension fund related assets, which represent ownership interests of multiple independent investors, may be used to purchase the first investment and thereby each investor may become an indirect investor in the first investment. Alternatively, such assets, or a portion thereof, may be used as the first investment.

Next, the portfolio is collateralized to obtain financing, as shown at step 14. For example, this may involve pledging all or a portion of the first investment as collateral to obtain collateralized financing. For this purpose, the investment must be "collateralizable", i.e. sufficiently credit worthy to act as collateral in support of financing. As "collateral" or "collateralize" is used herein, this may or may not results in a contractual or legal surety. It should be noted that such financing is not margin lending; there will be no "margin call" and federally regulated margin lending rules do not apply. Such financing is typically characterized by longer terms than those associated with margin lending. From the financier's perspective, the financing is collateral-backed lending obtainable in accordance with the lender's normal underwriting policies. The financing may take any suitable form, e.g. a line of credit, a self-liquidating loan, a fixed rate loan, a variable rate loan, an interest-only loan, a term or balloon loan, or any combination of one or more thereof. Advantageously, such financing allows for the acquisition of a second investment, e.g. real estate assets, on an all-cash basis, free and clear of liens at the time of purchase. This provides an advantage over competing prospective purchasers of the real estate assets because it eliminates potential problems associated with financing contingencies.

The financing is then used to acquire a second investment, as shown at step 16. As referred to above, an advantageous diversification effect can be achieved by acquiring first and second investments falling in different asset classes. As used herein, "acquiring" refers to both financed purchases from third parties, or a reorganizing of finances resulting in or from pooled investor capital.

Finally, at least a portion of any available returns on the second investment is applied to the benefit of the investors in the first investment, e.g. as deemed appropriate by a manager of the investment program, and the method ends, as shown at steps 18 and 19. This step is discussed below in further detail with reference to FIG. 3.

In this manner, each of the independent investors effectively (although not necessarily directly or as the result of legal title) becomes an investor in a combined asset investment, e.g. a combined investment of first and second asset classes, without the need for reallocation or addition of investment capital. Rather, each investor pays (or commits capital) to become an investor in the first investment, and the first investment is leveraged to acquire and/or operate the second investment. For investors that have already invested in a first investment, better returns may be realized by simply leveraging the existing first investment to purchase a second investment that may provide additional returns, enhanced diversification, etc. Accordingly, the present invention is particularly useful to better leverage existing long term savings of individual investors, such as retirement-related investments.

Therefore, this method is suitable for use with, for example, existing mutual finds, pension funds/pension fund assets, insurance companies that manage assets for annuity products, new assets pools/portfolios likely to be formed in connection with the proposed privatization of the U.S. Social Security initiative, or new investment vehicles established specifically for carrying out the inventive method. As used herein, an "investment vehicle" includes, for example, a mutual fund, unit investment trust, a limited or general partnership, a limited liability company, a publicly held stock company, a C-Corp, S-Corp, Foreign Corp. Investment Trust, or any suitable form of structure.

Additionally, the present invention may be used to refinance real assets owned by an REIT using another asset as collateral for the refinancing. For example, an REIT could purchase or otherwise gain control of securities, thereby forming the first investment, and then reorganize its financing and/or structure, thereby acquiring the second investment. Alternatively, the REIT could pool its current outstanding shares or shareholders and use those shares as the first investment.

It is particularly advantageous to use as a first investment a portfolio of securities selected to achieve an objective of growth, e.g. long term growth, and as a second investment any income-producing asset. As used herein, an investment selected for achieving an objective of "growth" is any asset of a type generally selected for its ability, inclination or intent to produce growth of capital. This may include portfolios including individual investments having other than growth characteristics. As used herein, an "income-producing" asset, or an asset "selected to achieve an income-producing objective" is any asset of a type generally selected for its ability, inclination or intent to produce income. This combination provides both growth and income opportunities as well as sufficiently stable collateral to support collateral-backed lending and a high degree of leverage. Additionally, these complementary investments may be managed to provide a synergistic effect. In particular, they may be managed with a common objective of enhanced returns to the investor by cross-utilizing the growth of the securities and the income from the real estate to provide enhanced returns. This synergy is particularly acute because of the liquidity of the securities investments and the illiquidity of the real estate investments.

Figure 2:
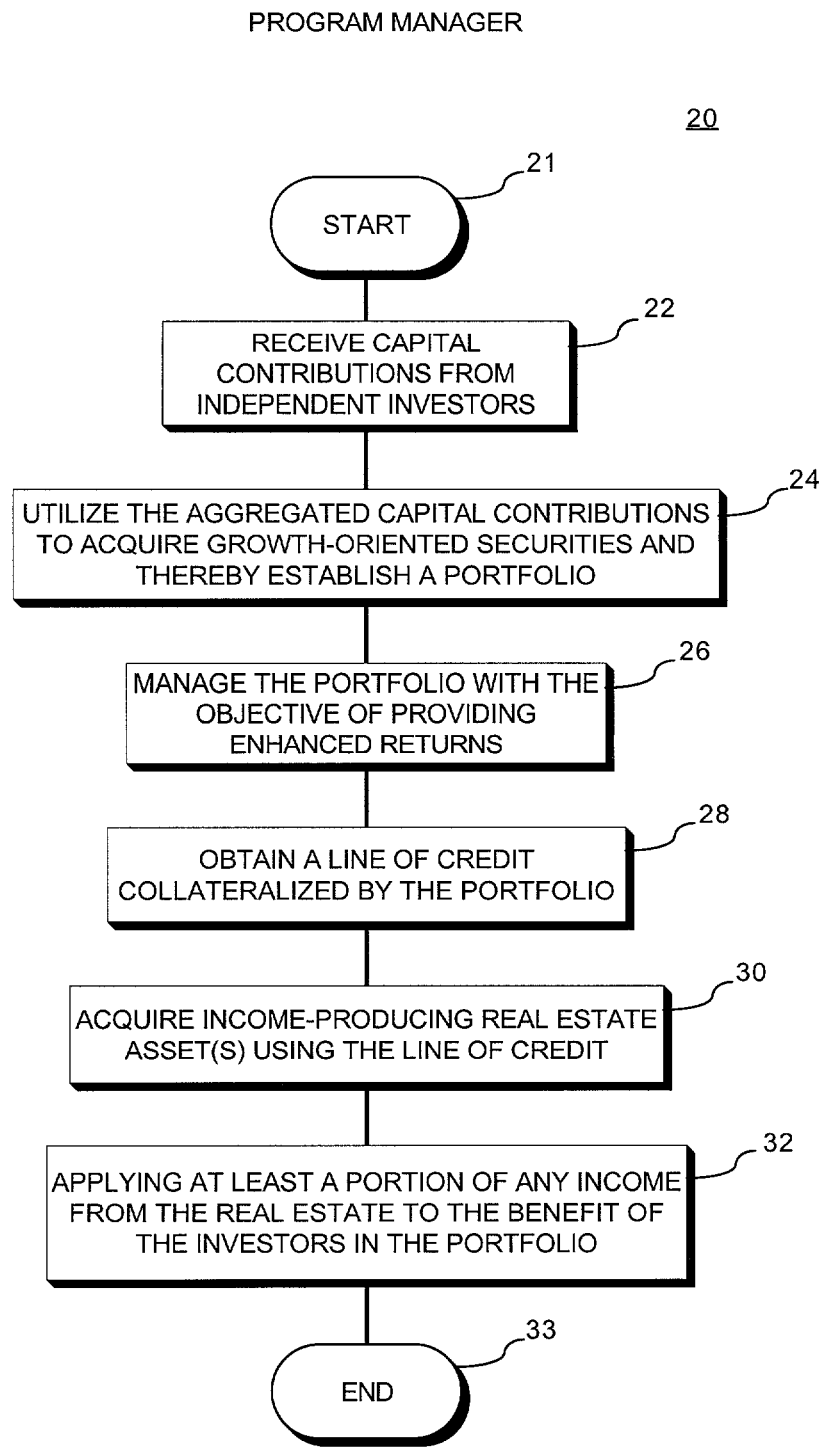
FIG. 2 is a flow diagram of an exemplary embodiment of a method in accordance with the logic of FIG. 1.

FIG. 2 is a flow diagram 20 of an exemplary embodiment of a method in accordance with the logic of FIG. 1 which involves investment in growth securities and income-producing real estate. The example of FIG. 2 involves establishment of a new investment vehicle, namely an investment fund, by an entity referred to as a Program Manager.

Referring now to FIG. 2, the exemplary method starts with the receipt of capital contributions from independent investors, as shown at steps 21 and 22. For example, the capital contributions may be received in cash and deposited with an investment firm for cash management and creation of a managed securities portfolio, as discussed below.

As shown at step 24, the capital contributions are aggregated, e.g. pooled, and at least a portion of them are used to establish a first investment. In this example, the first investment is a portfolio of securities purchased with the aggregated capital contributions. It will be appreciated that in other embodiments, a fund is similarly "established" although at least some of the shares in the portfolio may have been purchased before receipt of an investor's capital contributions and that the investor is therefore simply "buying in" to an established portfolio. As used herein, the term "securities" is intended to be broader than its typical industry usage, and in particular to include at least any equities, bonds, debentures other debt obligations, mutual funds, mortgages, cash, or combinations thereof.

In this example, the portfolio comprises primarily equities, e.g. common stock of "blue chip" companies, or other high-quality investments selected such that the portfolio is intended to achieve an objective of long term growth. Such a portfolio is advantageous because of the historic stability of equities and the proven capacity for sustained long term growth. Various techniques are well known in the art for selecting equities and/or a portfolio for achieving an objective of long term growth. In this example, the fund holds the portfolio of securities and any residual cash from capital contributions, income etc. such that a proportionate share of the portfolio and any residual cash or income is owned by each of the independent investors. This may involve issuance of shares or a statement of shares owned as is well known in the mutual fund industry. Additional equities may be periodically added or removed from the portfolio in the course of administering the fund, as is well known in the art.

In this embodiment, the investment vehicle including the portfolio is then actively managed with the objective of providing enhanced returns, as shown at step 26. For example, the enhanced returns may be the result of stock-selection, growth, diversification, re-balancing of the portfolio, etc. Optionally, dividends, income etc. resulting from ownership of the securities may be distributed to the investors, held for reinvestment, reinvested, etc. Various such actions may increase the securities available as collateral or reduce the degree of leverage of the portfolio. Numerous techniques are known in the art for actively managing a securities portfolio with the objective of providing enhanced returns. Accordingly, steps 22-26 encompass the establishment of new investment vehicles and the prior establishment of existing investment vehicles, e.g. mutual or other investment funds.

In accordance with the present invention, the portfolio is then collateralized, e.g. pledged as collateral, to obtain financing, as shown at step 28. In the example of FIG. 2, the financing includes a line of credit. In a preferred embodiment, the financing is provided by an investment firm, namely the investment firm actively managing the portfolio in step 26. In this manner, it is anticipated that favorable financing will be obtainable as a consequence of the financing being collateralized by a portfolio under the investment firm's management and control.

Preferably, the financing obtained provides leverage of the first investment in the range of 50 to 100%, and more preferably in the range of 50% to 80%, such ranges may be more or less, but in any event should conform to traditional collateral-backed lending practices and offering substantial opportunities for enhanced returns while assisting to ensure that any decreases in value of the equities portfolio do not affect prescribed loan collateralization parameters.

The financing, e.g. line of credit, is then used to acquire a second investment, as shown at step 30. In the example of FIG. 2, the second investment is an investment selected to achieve an income-producing objective, namely income-producing real estate. Examples of such investments include rental and commercial real estate operable for rental income, ongoing businesses such as restaurants, restaurant franchises, nursing homes, assisted living facilities and land acquired for development. As used herein, a "real estate asset" is any asset involving the acquisition of real estate.

In certain embodiments, the acquisition of a second investment in step 30, and/or the obtaining of financing in step 28, is delayed until the first investment, or a fund holding the first investment, reaches a predetermined threshold, e.g. $100 Million of capitalization or a predetermined percentage of the total value of the collateralizable first investment. For example, this may be determined by operation of a data processing system in accordance with the present invention, as discussed below.

It is advantageous to select income-producing real estate investments with a long-term income-producing objective. Over time, multiple real estate investments may be made in accordance with the present invention. Preferably, real estate investments are made with geographic and property type diversity and various holding periods. Discretion is retained for early sales as market conditions and opportunity may dictate.

Finally, the example of FIG. 2 ends with applying of at least a portion of any returns, namely the income, on the second investment, namely the income-producing real estate, to the benefit of the independent investors. This step is discussed further below with reference to FIG. 3. In this manner, each of the plurality of independent investors effectively becomes an investor in a combined investment of the first and second investments. Legal title to the second investment may be held by the independent investors, the investment vehicle on behalf of the investors, or another legal entity. In some embodiments, each of the independent investors becomes an owner of a proportionate share of the second investment by ownership of a fund holding the second investment. In other embodiments, ownership shares are issued to each of the investors to reflect an ownership interest in the combined investment.

Figure 3:
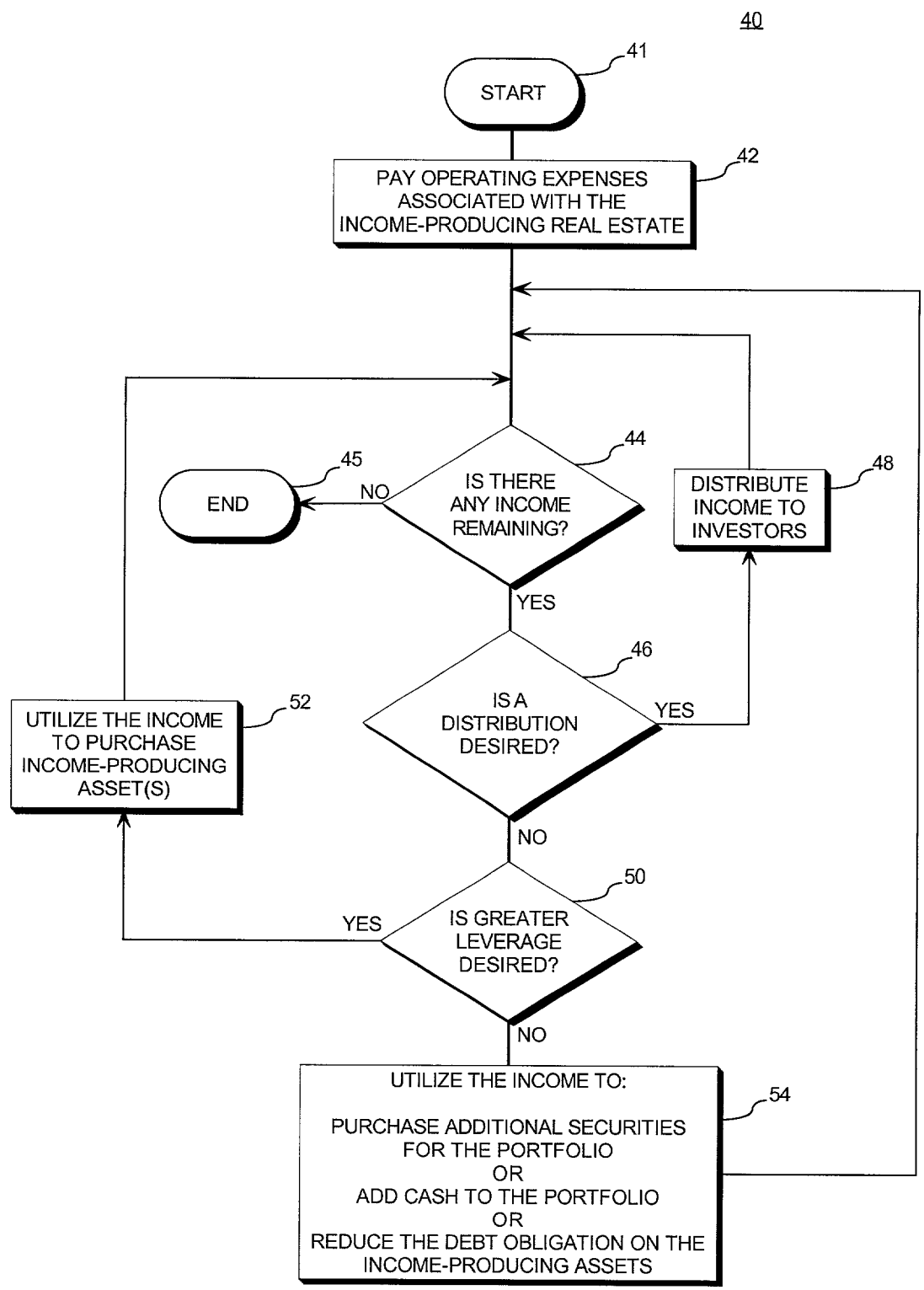
FIG. 3 is a flow diagram of an exemplary embodiment of the applying step of FIG. 2.

FIG. 3 is a flow diagram 40 of an exemplary embodiment of the applying step 32 of FIG. 2. Specifically, the flow diagram 40 of FIG. 3 provides exemplary logic of how income from an income-producing assets acquired with financing collateralized by 3a securities portfolio may be applied to the benefit of the investors in the securities portfolio. Referring now to FIG. 3, the exemplary applying step starts with payment of operating expenses associated with the income-producing real estate, as shown at steps 41 and 42. For example, if the income-producing real estate includes leased commercial real estate, the income may include aggregated lease payments, as well as all other customary expenses associated with its operations.

As shown at step 44, it is next determined whether there is any income remaining from real estate operations. If not, the method ends, as shown at step 45. If there is remaining income, it is determined whether a distribution is desired. If so, at least a portion of the income is distributed to the investors, as shown at step 48, and it is again determined whether there is any remaining income as shown at step 44.

If it is determined at step 46 that a distribution is not desired, it is then determined in step 50 whether greater leverage is desired, as shown at step 50. If so, at least a portion of the income is used to purchase additional assets, e.g. additional income-producing real estate. For example, the income may be pooled with additional, previously received income, as discussed below with reference to step 54. To the extent that the financing collateralized by the portfolio is used to make the purchase of the additional assets, this further leverages the portfolio. It is then again determined whether there is any remaining income as shown at step 44.

If it is determined in step 50 that greater leverage is not desired, then at least a portion of the income may be used to decrease leverage, as shown at step 54. For example, a portion of the income may be used to purchase additional securities for the portfolio, to add cash to the portfolio and/or related investment vehicle, or to reduce a debt obligation on the income-producing assets resulting from the financing therefor, e.g. by paying down the line of credit used to purchase the real estate. Alternatively, at least a portion of the income may be applied to pay operating expenses relating to the first or second investment, including any management fees for operating the investment vehicle. It is then again determined whether there is any remaining income as shown at step 44.

In this example, this process continues until all income for a given period has been applied to the benefit of the investors in the investment vehicle holding the portfolio of securities.

Any increase in value of the first investment, e.g. the securities portfolio, may be reinvested to provide a source of additional collateral to either reduce the extent to which the portfolio is collateralized/leveraged, to realize additional gains/profit, or to increase the amount of capital available as collateral.

It should be noted that the first and second investments may be managed with a common goal of providing enhanced returns to each or both asset classes and to provide a synergistic effect by cross-utilizing each asset's unique characteristics. For example, the growth of the securities and the income from the real estate may be cross-utilized to provide enhanced returns. In this manner, an extremely versatile investment management platform is provided that will enhance the overall safety of the combined asset investment while providing enhanced returns. This synergy is particularly acute because of the liquidity of the securities investments and the illiquidity of the real estate investments. For example, in times of low interest rates, any debt on both investments may be adjusted accordingly by locking in long term debt on the income-producing investment. This will allow for an opportunity to purchase additional investments. Alternatively, more income from the second investment may be used to reduce the debt collateralized by the first investment, thereby enhancing composite returns to the investor. In times favorable to growth of securities, more income from the second investment may be used to acquire additional growth-oriented securities from the second investment, thereby enhancing composite returns to the investor. Accordingly, such a combined asset class investment may be managed, and the returns from each investment cross-utilized, to cause the income-producing asset to service the debt used to acquire it, the eventual result being the free and clear ownership of both the securities portfolio and the income-producing asset. In this manner, each investor effectively acquired two investments for the price of one.

By way of further example, returns from securities and income-producing real estate can be cross-utilized as follows. Consider a real estate investment of $10,000,000 purchased using a $5,000,000 loan collateralized by a $250,000,000 securities portfolio and $5,000,000 collateralized by the real estate itself. In the event that the real estate is temporarily vacant and producing no income, even a modest average dividend, e.g. 2%, on the securities in the portfolio could be used to service the debt and pay operating expenses, thereby maintaining the real estate investment until an income-producing lease was obtained. In this manner, an income producing asset was acquired, operated, safeguarded and more likely than not eventually sold for either a cash profit (appreciation), or purposefully sold at a loss to mitigate prospective tax liability on any gains received on the first investment, without the need for additional capital.

As referred to above, the present invention is equally applicable to an already established investment vehicle, e.g. one in which the capital contributions of the independent investors have already been received and/or a first investment is already held by the investment vehicle. A first investment of such an existing investment vehicle may be collateralized to obtain financing, the financing being used to acquire a second investment, at least a portion of any returns on the second investment being applied to the benefit of the investors. Accordingly, for example, Investment Group ABC may pledge as collateral all or a portion of the underlying assets of its XYZ Fund, proportionate shares of which are already held by multiple independent investors. Financing obtained by collateralization of such assets may then be used to purchase a second investment, e.g. income-producing real estate, and the income or other returns on the real estate may be applied to the benefit of the investors. In this manner, existing investors of the XYZ Fund get additional investment utility for each dollar of investment capital by becoming the beneficiaries of the additional real estate or other investments without a need for additional capital contributions.

In certain embodiments of the invention, investors shall receive regularly scheduled distributions equal to their proportionate share, preferably an amount up to about one half of all available net cash flow from real estate operations.

In a highly preferred embodiment of the present invention, after the cumulative return of 100% of an investor's initial capital contribution, operations will continue. It will be appreciated that after any investor receives an amount equal to 100% of the investor's initial capital contribution (through growth or receipt of income, dividends, etc.), the program takes on an inertial characteristic in that the investment vehicle is self-funded and may continue in perpetuity. Thereafter, upon the sale of any individual real estate or securities holding, the investor may receive a proportionate share of the net gains resulting from the sale.

Optionally, no up front fees are charged by the Program Manager. For providing day-to-day management of an investment vehicle for implementing the present invention, the Program Manager may receive instead a percentage of the gross annual collected income from real estate operations paid monthly, e.g. 1.5%, or in the alternative may receive 0.25% of the total value of the combined asset investment. To add to investor confidence, the receipt by the Program Manager of any ownership or equity interest may be deferred until there is either a full return of 100% of initial investor capital or the total value of the first investment exceeds twice the investor's initial capital contribution, and preferably thereafter only limited, e.g. 10%, participation is earned.

By way of further example, in another embodiment of the present invention the securities portfolio is capitalized by issuing to investors bonds, debentures or like debt obligations. Preferably, the principal, rate of return, or both of the debt obligations are insured by a third party guarantor, such as an insurance company, bank or other financial institution. As used herein, "insurance company" refers to both primary insurers and reinsurers. The rating of the debt obligation will reflect the rating of the insurer. In such an embodiment, any increase in the overall value of the securities portfolio or the income producing asset could also be used to extinguish the insurance obligation, prepay the debt obligations in whole or in part, issue more debt instruments, etc.

Figure 4:
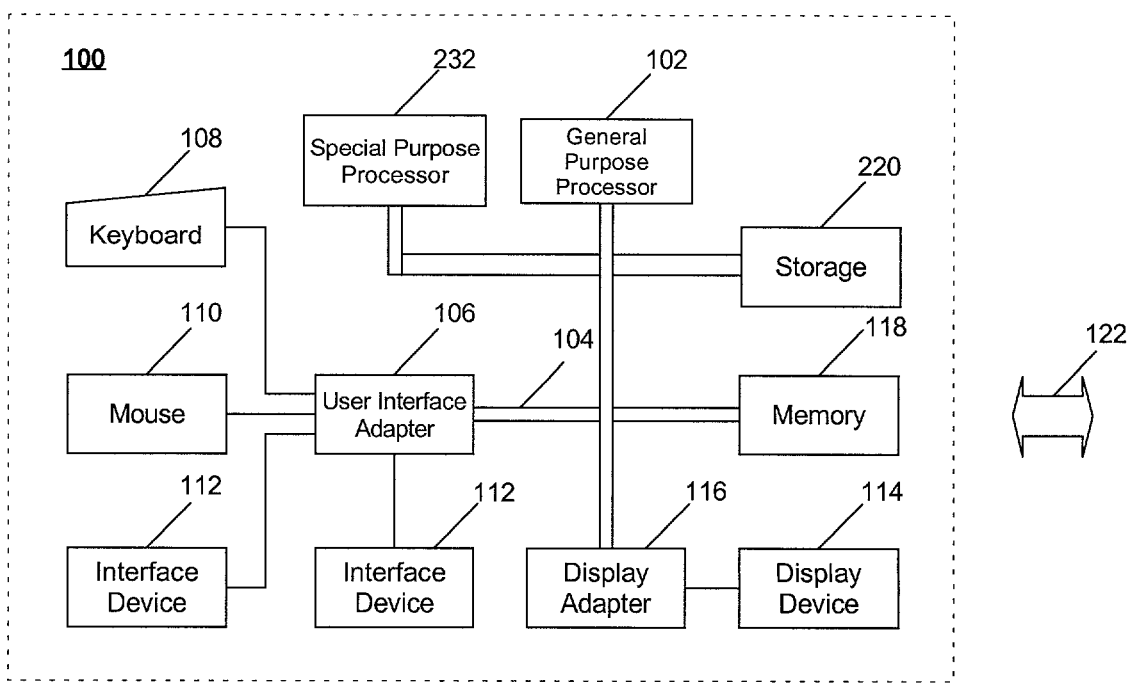
FIG. 4 is a block diagram of a workstation for managing a combined asset class investment in accordance with the present invention.

FIG. 4 is a block diagram of a data processing system 100 in accordance with the present invention. As is well known in the art, the data processing system of FIG. 4 includes a processing device, e.g. a personal computer, including related peripheral devices. The data processing system 100 includes a general purpose microprocessor 102 and a bus 104 employed to connect and enable communication between the microprocessor 102 and the components of the data processing system 100 in accordance with known techniques. The data processing system 100 typically includes a user interface adapter 106, which connects the microprocessor 102 via the bus 104 to one or more interface devices, such as a keyboard 108, mouse 110, and/or other interface devices 112, which can be any user interface device, such as a touch sensitive screen, digitized entry pad, etc. The bus 104 also connects a display device 114, such as an LCD screen or monitor, to the microprocessor 102 via a display adapter 116. The bus 104 also connects the microprocessor 102 to memory 118 and long-term storage 120 (collectively, "memory") which can include a hard drive, diskette drive, tape drive, etc.

The data processing system 100 may communicate with other computers or networks of computers, for example via a communications channel, network card or modem 122. The data processing system 100 may be associated with such other computers in a LAN or a wide area network (WAN), or the data processing system 100 can be a client or server in a client/server arrangement with another computer, etc. All of these configurations, as well as the appropriate communications hardware and software, are known in the art.

Software programming code which embodies the present invention is typically stored 11 in memory of some type, such as the memory 118 and/or storage 120. The data processing system 100 stores in its memory microprocessor executable instructions. These instructions include instructions for tracking any returns received from a first investment representing ownership interests of a plurality of independent investors, for tracking any returns received from a second investment acquired with financing collateralized by said first investment, and instructions for monitoring financial market conditions and providing alerts when a prescribed threshold is met. For example, such financial market conditions may include a monitoring of lending or other interest rates, real estate market statistics, stock market statistics, inflation and/or indicators of trends in one or more of these. Such alerts may be used to initiate cross-utilization of returns between the first and second investments, to provide enhanced returns to the investors, e.g. to rebalance portfolios, to initiate sales or purchases of assets, to initiate distributions, etc. For this purpose, the system may automatically import or otherwise receive certain data from real estate operations and sales, financial markets, etc. and track the current valuations and leverage of the investments, and available credit that is indexed to the valuation based upon a preset and variable borrowing criteria. These and other ratios may be used to provide alerts to begin, stop, or resume acquisitions of investments. In addition, a pre-determined benchmark/threshold may be selected for moving in and out of the various securities to cash or other instruments and an optimum range to mortgage with fixed rate financing. For example, if fixed rate long term mortgage rates drop to or below, or at or above, a variable predetermined level or range, the system so indicates by an providing an alert to begin the process of increasing fixed or self amortizing mortgage debt, fixed interest only, or variable interest only loans, either short or long term maturity. Similarly, market or other conditions may be monitored and when 11 thresholds are reached, the system provides an alert to being the process of purchasing or selling securities, purchasing or selling real estate, refinancing the real estate, or cross-utilizing income or returns in various ways.

Optionally, the data processing system may also store instructions for determining each investor's proportionate share of returns received from said second investment as a function of each investor's respective capital contribution for said first investment, for tracking debt against the first investment resulting from acquisition of the second investment, for calculating an aggregate amount of proportionate shares of income distributed to each of said investors, and for calculating a ratio of the aggregate amount of proportionate shares of income distributed to each investor relative to the respective investor's capital contribution. The system may also store instructions for calculating a ratio of the combined return to the investor on the first and second investments relative to the respective investor's capital contribution, for creating an account database of separate investor accounts, each investor account comprising information on said investor and a capital contribution made by said investor, and for determining as a function of each investor's respective capital contribution each investor's proportionate share of a fund holding the first investment.

Additionally, the data processing system may store and maintain data for multiple investors, calculate and monitor the debt ratios, track, display and print reports of statistics regarding the investment(s) and its investors, rates of return, and investor capital. In particular, the data processing system may store and maintain records for multiple individual and institutional investors with varying start dates and changing proportionate percentage ownership interests, investment amounts and distribution schedules relating to respective proportionate shares of a fund embodying the present invention. The system may calculate distributions derived from the operation of the fund both before and after a full return of each investor's original and subsequent capital investment, with each such calculation independent of the other as well as cumulative.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed:

1. A computer-implemented method for cooperatively managing a combined asset investment product comprising a first investment portfolio and a second investment portfolio, the method comprising the steps of:

receiving control of a said first investment portfolio, wherein said first investment portfolio consists essentially of collateralizable securities comprising one or more asset classes selected from the group consisting of mutual funds, bonds, corporate stock and corporate debt obligations;

obtaining financing in the amount of approximately 50% to approximately 100% of the value of said first investment portfolio that is collateralized by pledging said portfolio of securities;

borrowing against said first investment portfolio to purchase a second investment portfolio comprising multiple income-producing real estate asset investments without borrowing against said income-producing real estate, wherein said real estate asset are purchased using a computer executing software instructions to monitor market conditions and initiate purchases; and tracking income received from said income-producing real estate with a computer executing software instructions and using said income after paying portfolio expenses to rebalance the asset distribution between said first and second portfolios after a prescribed financial market threshold condition is met, wherein said threshold is determined by processing financial market condition data is using a computer executing software instructions to monitor said conditions and provide an alert when a prescribed threshold is met, and said market conditions comprise one or more conditions selected from the group consisting of market, lending and other interest rates, real estate market statistics, stock market statistics, inflation and indicators of trends thereof; and said portfolio re-balancing comprises:

using a computer executing software instructions to monitor market conditions and determine whether to increase leverage in said second asset portfolio;

utilizing the income to purchase additional income-producing assets for said second portfolio when said computer executing software instructions determines that leverage should be increased, wherein said computer executing software instructions is further used to monitor real estate market conditions and initiate purchases, and redistributing the income when said computer executing software instructions determines that leverage should not be increased, wherein said computer executing software instructions is further used to monitor market conditions and use the income to initiate one or more income redistribution steps selected from the group consisting of distributing income to the investors of said investment product, purchasing additional securities for said first portfolio, adding cash to said first portfolio, and reducing any debt obligation on said income-producing real estate assets.

2. The method of claim 1, wherein said first investment portfolio comprises a combination of securities selected for achieving an objective of long term growth.

3. The method of claim 1, wherein at least a portion of said debt obligations are insured by a third party guarantor.

4. The method of claim 1, wherein said financing is selected from the group consisting of a line of credit, a self-liquidating loan, a fixed rate loan, a variable rate loan, an interest-only loan, a term loan, a balloon loan, and any combination of one or more thereof.

5. The method of claim 1, wherein said collateralizable securities comprise at least a portion of the collateralizable securities of a pension fund.

6. The method of claim 1, wherein said corporate debt obligations comprise bonds or debentures.

7. The investment product method of claim 1 wherein at least a portion of said collateralizable securities of said first investment portfolio are mortgages or are bundled in a mutual fund.

* * * * *